Jan. 31, 1956 F. C. WILLIAMS ET AL 2,733,425

SERVO CONTROL MEANS FOR DATA STORAGE DEVICE

Filed Sept. 23, 1952 3 Sheets-Sheet 1

Inventors.
Frederic C. Williams
Gordon E. Thomas
By Young, Emery & Thompson
Attys.

Inventors
Frederic C. Williams
Gordon E. Thomas
By Young, Emery & Thompson Attys.

SERVO CONTROL MEANS FOR DATA STORAGE DEVICE

Inventors
Frederic C. Williams
Gordon E. Thomas
By Young, Emery + Thompson Attys United States Patent Office 2,733,425

Patented Jan. 31, 1956

2,733,425

SERVO CONTROL MEANS FOR DATA STORAGE DEVICE

Frederic Calland Williams, Timperley, England, and Gordon E. Thomas, Port Talbot, Wales, assignors to National Research Development Corporation, London, England, a corporation of Great Britain Application September 23, 1952, Serial No. 310,988

Claims priority, application Great Britain September 24, 1951

15 Claims. (Cl. 340—174)

The present invention relates to means for accurately positioning parts which are movable relatively to one another, and to means for varying the relative positions of such parts accurately and quickly under the control of electrical signals.

The invention has application, for example, to recording and reproducing means in which the accurate and speedy location of a reproducer or recorder relatively to a record or recording track is a requirement. Such a requirement arises in high-speed computing machines in which rapid access to any one of a number of data storage tracks or records is required; the provision of individual writing and reading means for each track is clearly uneconomical, and the possibility of accurately directing a single writing or reading head to any of a number of tracks offers advantages not only of economy, but also of simplicity.

An object of the invention is to provide means for accurately predetermining a required relationship between relatively movable parts. A further object is to provide servo means for rapidly and accurately causing relatively movable parts to assume a desired relationship predetermined from amongst a range of such relationships by applied electrical signals.

According to the invention, there are provided servo means arranged to be capable of moving a first member relatively to a second member, in which an electrical signal applied to control said servo means is derived by reference to a signal representing a desired relationship between said members, and signals dependent on the relative positions of said members and capable of representing a range of such relationships.

Thus, for example, according to the invention, signals capable of representing a range of such discrete relationships may take the form of electric pulse trains, the pulses in the several trains being intercalated so that pulses in any one train are preceded and succeeded in time by pulses of other trains: in such an arrangement, driving means for a first member relatively to a second are conveniently controlled by a current derived from an amplifier whose input is a function of a pulse signal representing the relative positions of the two members, and a signal defining a required positional relationship.

In order that the invention may be more readily understood an embodiment thereof, as applied to the positioning of reading and writing heads relatively to a magnetic recording surface in an electronic digital computing machine, will now be described by way of example with reference to the accompanying drawings, in which.

Figure 1:
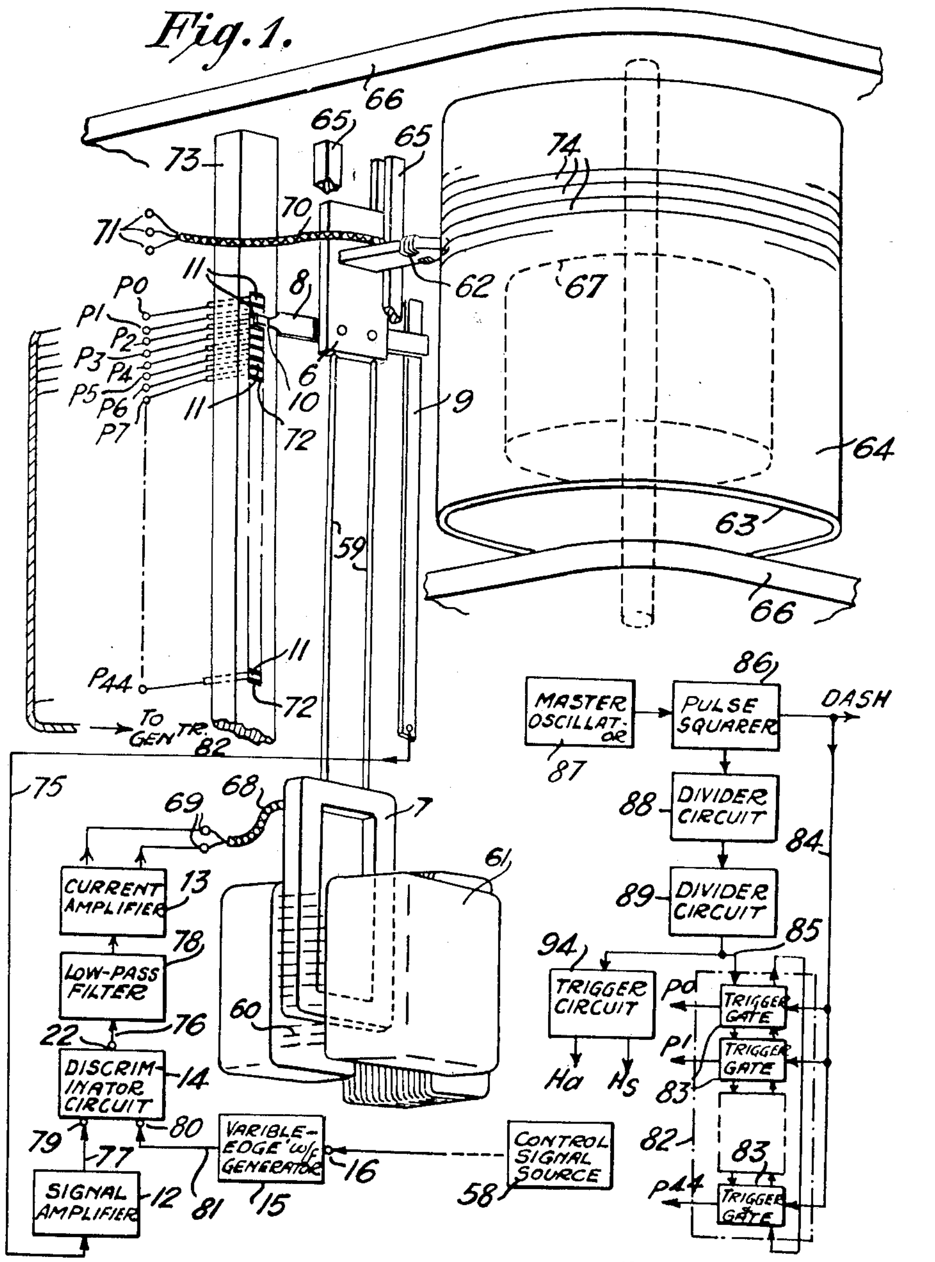
Fig. 1 is a schematic diagram of an arrangement according to the invention.

Referring first to Fig. 1, the device embodying the invention comprises a carriage 6 rigidly coupled by rods 59 to a flat, rectangular coil assembly 7 arranged to be capable of translational movement in a steady magnetic field denoted by the lines 60 maintained between the poles of an electromagnet 61. On the carriage 6 is mounted a combined magnetic write/read head 62 for writing on or reading from the magnetisable surface layer 63 of a rotatable drum 64. The general arrangement of such drum is similar to that described in Proc. I. E. E., February 1951, vol. 98, part II, pages 29–34 by F. C. Williams and J. C. West for use as an information store in an electronic computing machine. The latter is conveniently of the general type described in the same Proc. I. E. E. reference at pages 13 to 28 by F. C. Williams, T. Kilburn and G. C. Tootill.

The carriage conveniently runs between accurately machined parallel guides 65 secured to stationary frame parts 66 which also carry the bearings for the drum 64 which is driven by an electric motor indicated at 67 and built integrally within the drum. Flexible leads 68 serve to connect the coil 7 to stationary terminals 69 while similar flexible leads 70 serve to connect the magnetic write/read head 62 to stationary terminals 71.

In one construction which has proved satisfactory, the coil assembly 7 was constructed of eight flat coils connected in series and cemented together, each coil comprising 70 turns wound on a half-inch width circular paper former of 6″ diameter, and each former being folded into a flat rectangular shape. The carriage 6 was constructed in aluminium, and was coupled to the coil 7 by two light aluminium rods: the guides were adapted from a standard kinematic slide, and the arrangement was such that the carriage 6 moved vertically, parallel to the similarly vertical axis of the cylindrical drum 64.

Rigidly connected to the carriage 6 is a light, transversely disposed copper vane 8, one end of which moves in substantially constant and close spaced relationship to, but does not contact with, an elongated stationary metallic pick-up plate 9, and the other end of which vane is reduced to a small width to form a pick-up member 10. The latter moves along and in similar substantially constant and close spaced relationship to a linearly arranged assembly of spaced apart metallic segments 11 which are mutually insulated from one another by interposed insulation 72 and held in a stationary mounting bar 73 secured to the frame parts 66. The positioning of the segments 11 is arranged in accordance with the desired different positions for the magnetic head 62 relative to the drum 64, i. e. in accordance with the axial levels of the various separate circumferential tracks 74 around the drum. In the particular constructional embodiment which has been successfully operated, forty-five segments 11 were employed but only nine of these are shown in the drawing for the sake of clarity.

Each segment 11 is electrically connected to an individual terminal P0, P1, P2 . . . P44. Each of the terminals P0, P1 . . . P44 is supplied with an individual train of pulses, the pulses of the trains being intercalated and generated in a manner described later. The pick-up plate 9 is connected by lead 75 to the input terminal of an amplifier 12 which provides a magnified pulse output signal which is representative of the pulse input through the two capacities in series, formed between the segments 11 and the pick-up member 10 on the one hand, and the broader end of vane 8 and the pick-up plate 9 on the other hand.

The current flowing in coil assembly 7, which controls the position of carriage 6 and magnetic head 62 relative to the magnetic drum 64, is derived from a current amplifier 13, whose input is derived over lead 76 from the output terminal 22 of a discriminator circuit 14: the latter has one of its two input terminals 79 fed by way of lead 77 with signals derived from the amplifier 12 while its other input terminal 80 is supplied over lead 81 with a signal from what will hereinafter be termed a "variable-edge generator" 15. The nature and detailed functions of this generator 15 and of input signals therefor, applied to terminal 16, will be described hereinafter.

Figure 2:
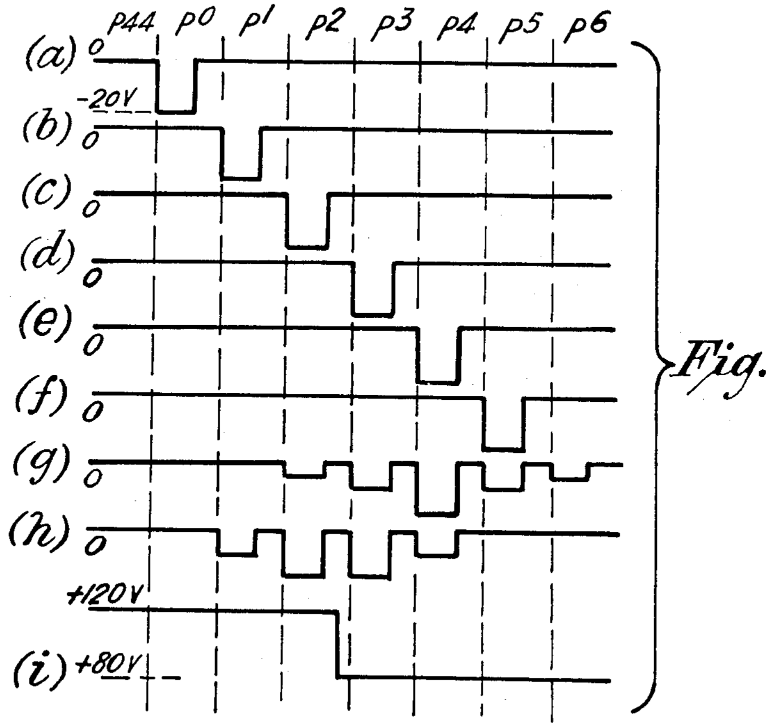
Fig. 2 is a series of illustrative diagrams showing certain of the signal waveforms involved in the arrangement of Fig. 1, Figs. 3 and 4 show in detail parts of the circuit of the arrangement of Fig. 1.

In Fig. 2(*a*) to (*f*) there are shown single pulses from the uniform trains of intercalated pulses which are applied to terminals P0 to P5 in Fig. 1. The pulses in these several trains will be referred to respectively as the *p*0, *p*1, *p*2, *p*3, *p*4 and *p*5-Pulses. These pulses are similarly intercated with *p*6 . . . *p*44-Pulses (not shown), the *p*44-Pulse being followed by *p*0, *p*1, *p*2 . . . pulses in regular sequence. In the particular example being described, the *p*-Pulses were all of 20 volts amplitude, negative-going, their duration was 6 microsecond intervals while pulses *p*0, *p*1, *p*2 and so on succeeded one another at 10 microsecond intervals. Successive pulses in any one train therefore recurred at intervals of 450 microseconds.

The series of intercalated *p*-Pulse trains are generated in a device 82 which comprises a total of forty-five trigger circuits 83 each having a gate circuit combined therewith by which a pulse existing on lead 84 may be fed through the gate to the associated gate output when the trigger circuit is in one state and inhibited from passing when the trigger circuit is in its other state. The various trigger circuits 83 are interconnected with the immediately adjacent circuits on either side to form a serial chain whereby the first trigger circuit of the chain, upon being triggered by an input pulse on lead 85 allows the next following pulse on lead 84 to pass to the gate output and is then reset to close the gate, at the same time triggering the next following trigger circuit which allows the next pulse on lead 84 to pass to its own gate output and so on to provide the required forty-five trains of intercalated pulses.

The pulses on lead 84 correspond to the Dash pulses of the computing machine as described in the aforesaid Proc. I. E. E. references and are generated in a pulse squaring circuit 86 which is fed with the sine-wave output of a master or clock oscillator 87 operating at 100 kc./s. The initial input triggering pulse to the first trigger circuit 83 on lead 85 may be derived from the last trigger circuit whereby the arrangement comprises an endless chain. More preferably however the input on lead 85, once in every 45 Dash pulses on lead 84 is derived by counting down the pulses from circuit 86 in a first divider circuit 88 followed by a second divider circuit 89.

Fig. 2(*g*) illustrates the nature of the signal fed to amplifier 12 when the member 10 lies immediately over the segment 11 which is fed with *p*4-Pulses, so that such *p*4-Pulses contribute the signal of maximum amplitude. The contributions of neighboring segments may be controlled by altering the shaping of member 10. Assuming the vane 8 to remain stationary, the same input signal would be recurrent at 450 microsecond intervals.

Fig. 2(*h*) shows the form of input signal supplied to amplifier 12 when the member 10 lies symmetrically between the two segments 11 which are fed respectively with *p*2- and *p*3-Pulses: the contributions of these segments are equal only when member 10 lies midway between the segments, and according to the invention, means are provided for permitting automatic discrimination between the contributions of any adjacent pair of segments so that the carriage 6 may be made to seek automatically the position in which a desired pair of contributions are equal. For this purpose, a recurrent Variable Edge waveform, of which one leading edge is shown in Fig. 2(*i*), is used and is generated by the variable-edge generator 15. The discriminator 14 is arranged to furnish an output dependent on the extent to which inequality exists between the contribution on each side of the said leading edge.

Figure 3:
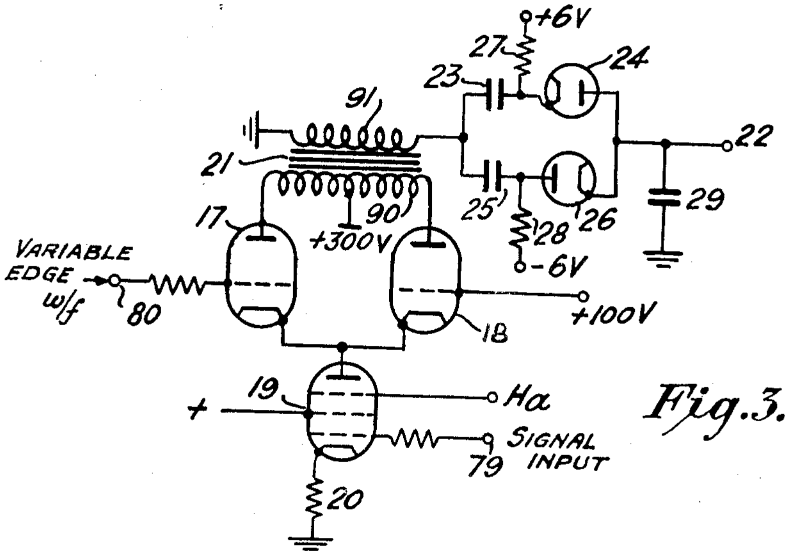

It is convenient at this stage to describe the operation of the discriminator circuit 14, the essential elements of which are illustrated in Fig. 3. As shown in this figure, the two triode valves 17, 18 have their cathodes interconnected and joined to the anode of a "tail" valve 19 whose cathode is connected to earth through a resistor 20. The anodes of valves 17, 18 are connected to opposite ends of the centre-tapped primary winding 90 of a transformer 21. The secondary winding 91 of the transformer 21 has one end earthed, and the other end connected to the output terminal 22 through parallel paths comprising series-connected condenser 23 and diode 24, and series-connected condenser 25 and diode 26, respectively. The diodes are oppositely connected as shown, the cathode of diode 24 being joined through leak resistor 27 to a source of positive potential +6 v., and the anode of diode 26 being joined through leak resistor 28 to a source of negative potential −6 v. The centre-tap of the primary winding 90 of transformer 21 is connected to a source of positive potential +300 v. and the grid of triode valve 18 is maintained at +100 volts relative to earth by direct connection to a source of positive potential +100 v. A condenser 29 is connected between the terminal 22 and earth.

The output of the signal pulse amplifier 12, Fig. 1, is applied, with the pulses in positive-going sense, to the control grid of "tail" valve 19 through input terminal 79 while the Variable-Edge waveform, Fig. 2(*i*), from generator 15 is arranged to swing the control grid of valve 17 from +120 volts to +80 volts by application thereto through input terminal 80.

The operation of the discriminator circuit is as follows: Assuming for the present that the suppressor grid of tail valve 19 is supplied with a potential which renders the valve conductive to its anode, then upon application of a pulse on its control grid, valve 19 passes current and this current flows only in valve 17 whilst the control grid of this valve is at +120 volts, but only in valve 18, when, at the occurrence of the negative-going step, Fig. 2(*i*), of the Variable Edge waveform, the control grid of valve 17 falls to +80 volts. When the anode current pulse from valve 17 flows through the associated half of the primary winding of transformer 21, the secondary winding current causes the charging of condenser 29 in one direction whereas charging of such condenser 29 is in the opposite direction when the secondary current is reversed due to the flow of primary current through valve 18. That is to say, before the variable edge, a pulse which causes valve 19 to pass current causes condenser 29 to charge in one sense, whereas after the variable edge the sense of charging of condenser 29 is reversed. Consequently, as a condition of equality between the contributions to the input of valve 19 represented by a pair of *p*-Pulses lying on either side of the variable edge is approached, the output terminal 22 tends, at each successive recurrence of the input waveform to valve 19, to seek earth potential. When equality is achieved, the input to amplifier 13 from terminal 22, and hence the current in coil asssembly 7, falls to zero and the carriage 6 comes to rest.

It will be evident that the potential of the control grid of valve 17 must be allowed to rise again from +80 volts to +120 volts at some time between successive negative-going steps of the Variable-Edge waveform so that such variable edge may be re-defined; conveniently, this completion of the negative-going pulse of the Variable-Edge waveform is effected (in a manner described below) about 450 microseconds after the occurrence of the variable edge. In order to prevent such return of the Variable-Edge waveform to its +120 volt level from having any influence upon the charge on condenser 29 (since it may coincide in timing with the next following pulse signal arriving at the control grid of valve 19) the suppressor grid of valve 19 is supplied with a gating waveform, referred to below the H*a* waveform, and illustrated in Fig. 5(*a*). This waveform has a period time of 900 microseconds and comprises two equal positive and negative going half cycles each coinciding with one complete series of *p*-Pulses, *p*0 . . . *p*44. This waveform and its opposite phase version, the H*s* waveform of Fig. 5(*b*) correspond to the Halver waveforms of the computing machine described in the above quoted references. They are conveniently generated by means of a trigger circuit 94 (Fig. 1) which is arranged to be reversed by each forty-fifth Dash pulse delivered from the second divider circuit 89.

It will thus be seen that, as only alternate series of *p*-Pulses are effective on the control grid of valve 19 the operation of the discriminator is recurrent at 900 microsecond intervals, so that the charge on condenser 29 is adjusted at the same intervals until the desired condition of equality is reached, whereupon the increments of charge contributed by valve 17 and 18 remain equal until the negative-going step of the Variable-Edge waveform is re-located. A suitable low-pass filter 78 is provided in the lead 76 between the output terminal 22 of the discriminator circuit 14 and the input to the current amplifier 13.

The Variable-Edge waveform generator 15 (Fig. 1) may be provided with a manual control of the location, relative to the *p*-Pulses, of the negative-going variable edge, but it is convenient to provide means whereby a coded control signal applied to terminal 16 from a suitable source 58, such as the main control section of the computing machine, may automatically predetermine a required location of the variable edge, and hence of the carriage 6 from among a range of possible locations. One form of Variable-Edge waveform generator which may be controlled in this way is illustrated schematically in Fig. 4.

Figure 4:
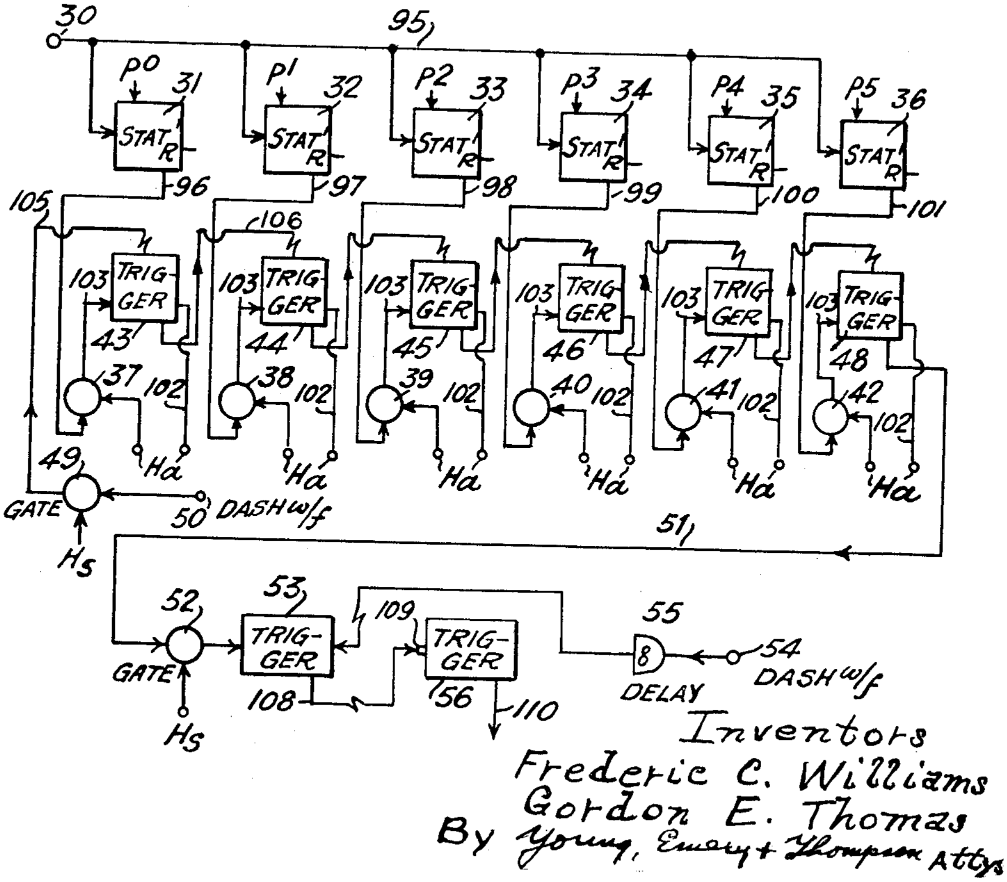

Referring to Fig. 4, an "address" signal defining a desired position for the carriage 6 is applied to input terminal 30. This signal represents a six digit binary number and is in the form of a serial pulse train comprising a number of successive digit-representing time intervals of 10 microseconds each, the pulse content of which intervals signals the particular binary value of the digit of the related interval, the digit 1 being marked by a pulse and the digit 0 by the absence of a pulse from the digit interval. This signal corresponds in form and timing with the first six places of the number and instruction word signals of the computing machine in the quoted references. A six digit address allows 64 possible positions to be defined, but not all of these will be employed, since, in the particular arrangement herein described, only 45 *p*-Pulses, and 45 segments 11, are provided.

This address signal is applied simultaneously over lead 95 to six staticisor sections 31 to 36 arranged to be set up in turn by the appropriate different ones of the six digits of the address signal. Each staticisor section conveniently takes the form of a two-stable-state trigger circuit which is triggered into one (the set or "on") state by an input pulse supplied through a coincidence or And type gate circuit which is opened only during the time of the particular digit-interval of the applied signal to which the staticisor section is related. Thus, with an address signal whose respective digits coincide with the *p*-Pulse periods *p*0 . . . *p*5, the first staticisor section 31 will have its integral gate circuit opened by the *p*0-Pulse and will be affected as to its setting only by the first pulse of the address signal train. Similarly the second staticisor section 32 will be affected only by the second pulse of the address signal and so on. An example of a suitable staticisor circuit arrangement is shown in Fig. 15 of the Proc. I. E. E. reference by F. C. Williams, T. Kilburn and G. C. Tootill already mentioned. The arrangement is such that each of the several staticisor sections furnishes a positive output (denoting the "set" or "on" condition) when the corresponding digit in the address is "1," and a negative output (denoting the "re-set" condition) when the corresponding digit is "0." Thus, for example, if the input address is 010101 (i. e. 42) the outputs of the staticisors 31 to 36 are alternatively negative and positive. The staticisor outputs are applied respectively, over leads 96—101 and through "And" gate devices 37 to 42, to counter circuits 43 to 48. Each device 37 to 42 is also fed with the H*a* waveform shown in Fig. 5(*a*). This H*a* waveform, is applied to all the terminals marked H*a* in Fig. 4, and its antiphase counterpart, the waveform H*s* of Fig. 5(*b*), is applied to all the terminals marked H*s* in the same figure. The gates 37—42 are opened during the negative-going phases of the H*a* waveform and remain closed throughout the positive-going phases.

Each counter 43 to 48 comprises a two-stable-state trigger circuit of known type, e. g. of the Eccles-Jordan type, arranged to have both separate triggering and resetting input terminals by which the circuit may be placed in either its "set" or its "reset" condition respectively and also a common trigger input terminal by which its condition may be reversed from an existing condition to the opposite condition at any time.

The resetting input terminal of each counter 43—48 is supplied by the right-hand leads 102 in the drawing with the differentiated H*a* waveform which serves to put each counter into the "reset" condition at the beginning of each negative excursion of such H*a* waveform. The triggering input terminals of each counter are those connected by leads 103 to the gate circuits 37—42 so that the negative-going edge of the H*a* waveform is admitted to any counter to cause triggering into its "set" condition only when the corresponding staticisor section output is negative. By such an arrangement in a negative-going interval of the H*a* waveform, the complement of the address number held by the staticisor sections 31—36 is transferred to the counters 43—48.

During the succeeding positive-going interval of the H*a* waveform the gates 37 to 42 are closed while a further gate circuit 49, which is controlled by the H*s* waveform and therefore open at this time, allows signals applied to terminal 50 to have access over lead 105 to the common triggering input terminal of counter 43. The output terminal of such counter 43 is coupled by way of lead 106 to the common triggering input terminal of the next counter 44 in the known manner of chain-connected counter circuits whereby counter 44 is reversed by an output from counter 43 whenever the latter is turned over from its "set" to its "reset" condition. The remaining counters 45—48 are similarly interconnected so that resetting of each counter may cause triggering to reverse the condition of the succeeding one. The waveform applied to terminal 50 conveniently comprises pulses of six microseconds duration and ten microseconds period time, and is constituted by the Dash waveform already referred to and provided by the pulse squaring circuit 86 of Fig. 1.

The manner of operation of this variable-edge waveform generator is as follows: If, for example the address signal applied to terminal 30 from source 58, Fig. 1, was 000000 then the setting of each of the staticisor sections 31 to 36 would be zero. Upon opening of gate circuits 37 to 42 by the negative phase of the H*a* waveform, the various counters 43 to 48, which were each individually reset to "0" condition by the negative-going leading edge of the same H*a* waveform at the beginning of the same phase, would each be triggered to the "1" condition since the outputs from the stiticisor sections are each negative-going under the prevailing conditions. The counter setting is therefore 111111, i. e. the complement of the address signal.

The first Dash pulse applied to counter 43 through terminal 50 and gate circuit 49 when the latter is opened by the next following negative phase of the H*s* waveform, causes counter 43 to reset and this, in turn, causes all the remaining counters 44 to 48 to reset rapidly with the result that a negative-going leading edge appears on output lead 51 from the last counter 48 with substantially no delay after the instant of commencement of the aforesaid negative Hs phase. If, on the other hand, the address signal was 100000 (reading from left to right) the counters 44 to 48 would be in the "1" state at the commencement but counter 43 would still be in its "0" or reset state. The first Dash pulse from gate circuit 49 would then be effective only to reverse the counter 43 from its "0" to its "1" state and it would be the second Dash pulse which caused the development of the negative-going leading edge on lead 51. Such negative-going leading edge would appear on lead 51 substantially in phase with the second dash pulse i. e. 10 microseconds later than the beginning of the negative phase of the Hs waveform. In general, each counter is either re-set or triggered by the first pulse reaching it as a result of the re-setting of the preceding counter; it will be immediately re-set if the digit in the corresponding stiticisor section is 0, but otherwise it will first be triggered and then re-set by the next pulse from the preceding counter. Thus, for example, if staticisor sections 31 and 32 are both set up to record the digit 1, counter 44 will not be re-set until the fourth Dash pulse in the negative phase of the Hs waveform resets counter 43. Similiarly, if staticisor sections 31, 32 and 33 record the digits 0, 0 and 1 respectively, counter 45 will not be re-set until the eighth Dash pulse re-sets counters 43 and 44. The resultant negative-going leading edge would then occur 70 microseconds later than the beginning of the negative phase of the Hs waveform.

Figure 5:
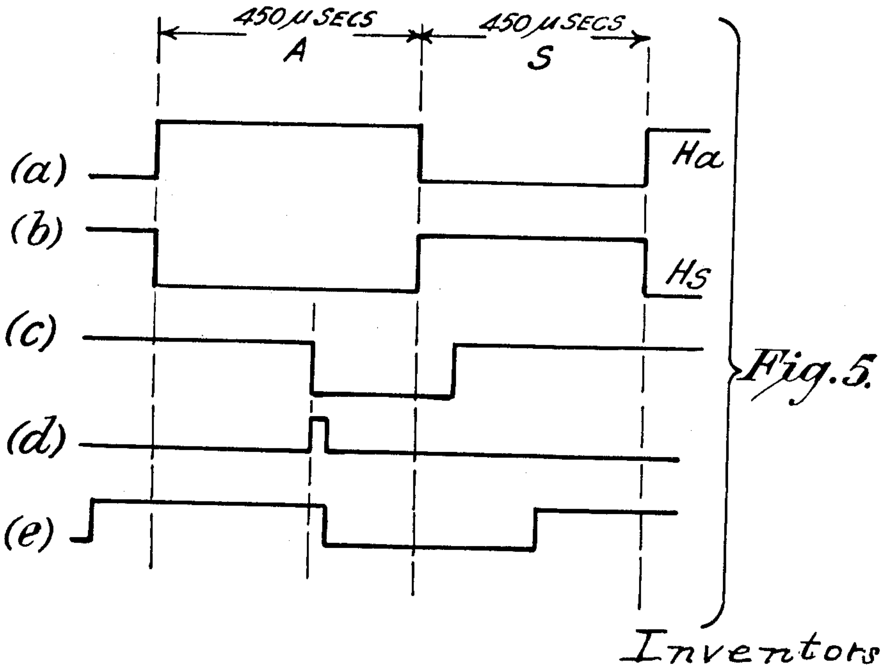
Fig. 5 is an explanatory diagram illustrating the operation of the circuit arrangement of Fig. 4.

Thus the negative-going output of counter 48 appears on lead 51 at a time during each negative excursion of the Hs waveform which is determined by the address number currently held in the staticisor sections 31 to 36. This output signal, one example of which is illustrated in Fig. 5(*c*), is then applied through an And gate circuit 52 to the triggering input terminal of a two-stable-state trigger circuit 53 to cause operation of the latter to its "set" or "on" condition. The Dash waveform previously referred to, is applied through terminal 54 and through a delay circuit 55, which operates to delay each applied pulse by eight microseconds, to the resetting input terminal of the trigger circuit 53. The resultant output signal on lead 108 from circuit 53 is accordingly as shown in Fig. 5(*d*), comprising a narrow pulse whose positive-going leading edge is engendered by the counter output signal on lead 51, and whose negative-trailing edge is due to the re-setting of circuit 53 by the coincidently arriving but delayed Dash signal. The negative-going edge of the signal pulse of Fig. 5(*d*) is applied by way of lead 108 to the triggering input terminal 109 of a trigger circuit 56 whose output on lead 110 provides the Variable-Edge waveform of Fig. 5(*e*) and Fig. 2(*i*). The trigger circuit 56 is of the mono-stable or true "flip-flop" type and is arranged to reset itself automatically after somewhat less than 450 microseconds. It may conveniently consist of a device of the transitron type. It will be observed that the 8 microseconds delay imposed upon the negative-going edge of the output pulse from the trigger circuit 53 causes the negative going step of the Variable-Edge waveform to occur two microseconds after the end of one *p*-Pulse and two microseconds before the beginning of the next *p*-Pulse.

The arrangement described above permits control of positioning of the carriage 6 in any one of a number of predetermined positions by means of a wholly transient control signal. In the particular embodiment the number of positions available is rather less than 45 due to the use of a balance point lying intermediate two segments 11 and due also to the fact that pick-up occurs between the number 10 and nearby segments 11 other than those immediately adjacent the member. This inconvenience can be avoided by providing one or two additional segments 11 at each end of the assembly and supplying these with the appropriate *p*-Pulse waveforms. Thus adjacent the segment 11 connected to terminal P0 there may be provided a further segment connected in parallel to terminal P44. Alternatively the member 10 may be shaped so that pick up is restricted to two immediately adjacent segments. In another alternative, the balance position may be arranged to coincide with the centre line of each segment by making the Variable-Edge waveform divide the principal signal pulse fed to terminal 79, Fig. 3, into two equal parts. In this case the delay device 55, Fig. 4, would be arranged to cause a delay of three microseconds only instead of eight.

We claim:

1. Servo control means for moving a first member relatively to a second member, comprising a plurality of signal sources providing a plurality of distinctive pulse train signals repetitive at a common frequency and each representative of a different one of a number of discrete positional relationships between said first and second members, signal selector means for selecting one signal of said plurality of signals, said selected signal being representative of the instantaneous positional relationship between said first and second members, a control signal source providing a continuous control signal having a characteristic element which is repetitive at the same frequency as said plurality of signals and which is variable over a range of values related respectively in a common predetermined manner to each one of said plurality of signals, driving means for causing relative movement between said first and second members, said driving means being controlled by an applied error signal and signal comparing means supplied with said selected signal and said control signal and providing an error signal to said driving means to effect relative movement between said first and second members until said selected signal has said common predetermined relationship to said control signal.

2. Servo control means for moving a first member relatively to a second member, comprising a plurality of continuously operating signal sources providing a plurality of repetitive pulse train signals, the pulses in such pulse train signals being intercalated in timing so that the pulses in any one train are preceded and succeeded in time by pulses of other trains whereby the timing of the pulses in each train, relative to the remaining trains, is characteristic of a particular one of a number of discrete positional relationships between said first and second members, signal selector means for selecting one pulse train signal of said plurality of pulse train signals, said selected signal being representative of the instantaneous positional relationship between said first and second members, a control signal source providing a control signal having a characteristic element therein which is repeated at the frequency of the pulses in said pulse trains and whose timing is variable over a range of values so as to have a predetermined time relationship with any desired one of said pulse trains, driving means for causing relative movement between said first and second members, said driving means being controlled by an applied error signal and signal comparing means supplied with said selected pulse signal train and said control signal and providing an error signal to said driving means to effect relative movement between said first and second members until said selected pulse train has said predetermined time relationship with the characteristic elements of said control signal.

3. Servo control means for moving a first member relatively to a second member, comprising a plurality of continuously operating signal sources providing a plurality of pulse train signals, the pulses in such pulse train signals having a common pulse recurrence frequency and being intercalated in timing so that the pulses in any one train are preceded and succeeded in time by pulses of other trains whereby the timing of the pulses in each train, relative to the remaining trains, is characteristic of a particular one of a number of discrete positional relationships between said first and second members, signal selector means for selecting one pulse train signal of said plurality of pulse train signals, said selected signal being representative of the instantaneous positional relationship between said first and second members, a control signal source providing a control signal having a characteristic element therein which is repeated at the pulse recurrence frequency of the pulses in said pulse trains and whose timing is variable over the range of values to be coincident with the pulses of any desired one of said pulse trains, driving means for causing relative movement between said first and second members, said driving means being controlled by an applied error signal and signal comparing means supplied with said selected pulse signal train and said control signal and providing an error signal to said driving means to effect relative movement between said first and second members until said selected pulse train has its respective pulses in time coincidence with the characteristic elements of said control signal.

4. Servo control means for moving a first member relatively to a second member, comprising a plurality of continuously operating signal sources providing a plurality of pulse train signals, the pulses in such pulse train signals having a common and constant pulse recurrence frequency and being intercalated in timing so that the pulses in any one train are preceded and succeeded in time by pulses of other trains whereby the relative timing of the pulses in each train, relative to the remaining trains, is characteristic of a particular one of a number of discrete positional relationships between said first and second members, signal selector means for selecting one pulse train signal of said plurality of pulse train signals, said selected signal being representative of the instantaneous positional relationship between said first and second members, a control signal source providing a control signal having a characteristic element therein which is repeated at the pulse recurrence frequency of said pulse trains and whose timing is variable over the range of values to be coincident with the pulses of any desired one of said pulse trains, electrically operated driving means for causing relative movement between said first and second members, signal comparing means supplied with said selected pulse signal train and said control signal and providing an error signal whose polarity is representative of the displacement of the relative positioning of said first and second members from that represented by said control signal, and an amplifier having its input supplied with said error signal and having its output connected to said driving means whereby the latter is energised to cause relative movement between said first and second members until said selected pulse train has its respective pulses in time coincidence with the characteristic elements of said control signal.

5. Servo control means for moving a first member relatively to a second member, comprising a plurality of continuously operating signal sources providing a plurality of pulse train signals, said pulse train signals having a common pulse recurrence frequency and having their respective pulses intercalated in timing so that each pulse train, by the timing of its pulses with respect to a particular one of said plurality of pulse trains, is characteristic of a particular one of a number of discrete positional relationships between said first and second members, a plurality of separate signal providing elements positioned in spaced fixed relationship to one another, means for supplying a different one of said pulse trains to each of said signal providing elements, an electric signal pick-up device movable with respect to said spaced signal providing elements for selecting a signal from said signal providing elements, said signal pick-up device being linked to one of said members so as to select a signal which is representative of the instantaneous positional relationship between said first and second members, a control signal source providing a continuous control signal having an abrupt change of potential repeated at a frequency equal to the pulse recurrence frequency of said pulse trains and variable in timing to be capable of being made coincident with the pulses of any one of said pulse trains, driving means for causing relative movement between said first and second members, said driving means being controlled by an applied error signal and signal comparing means supplied with said selected signal from said electric signal pick-up device and with said control signal and providing an error signal to said driving means to effect relative movement between said first and second members until said selected pulse train signal is one whose pulses are coincident with the abrupt changes of potential in said control signal.

6. Servo control means for moving a first member relatively to a second member, comprising a plurality of continuously operating signal sources providing a plurality of pulse train signals, said pulse train signals having a common pulse recurrence frequency and having their respective pulses intercalated in timing so that each pulse train, by the timing of its pulses with respect to a particular one of said plurality of pulse trains, is characteristic of a particular one of a number of discrete positional relationships between said first and second members, a plurality of separate signal providing elements positioned in fixed relationship to one of said members at spaced apart positions along the path of relative movement between said first and second members, means for supplying a different one of said pulse trains to each of said signal providing elements, an electric signal pick-up device secured to the other of said members for selecting a signal from said signal providing elements which is representative of the instantaneous positional relationship between said first and second members, a control signal source providing a continuous control signal having an abrupt change of potential repeated at a frequency equal to the pulse recurrence frequency of said pulse trains and variable in timing to be capable of being made coincident with the pulses of any one of said pulse trains, driving means for causing relative movement between said first and second members, said driving means being controlled by an applied error signal and signal comparing means supplied with said selected signal from said electric pick-up device and with said control signal and providing an error signal to said driving means to effect relative movement between said first and second members until said selected pulse train signal is one whose pulses are coincident with the abrupt changes of potential in said control signal.

7. Servo control means for moving a first member relatively to a second member, comprising a plurality of continuously operating signal sources providing a plurality of pulse train signals, said pulse train signals having a common pulse recurrence frequency and having their respective pulses intercalated in timing so that each pulse train, by the timing of its pulses with respect to a particular one of said plurality of pulse trains, is characteristic of a particular one of a number of discrete positional relationships between said first and second members, a plurality of separate signal providing elements positioned in fixed relationship to one of said members at spaced apart positions along the path of relative movement between said first and second members, means for supplying a different one of said pulse trains to each of said signal providing elements, an electric signal pick-up device secured to the other of said members for deriving a position-indicating signal from at least two mutually adjacent signal providing elements and which is representative of the instantaneous positional relationship between said first and second members, a control signal source providing a continuous control signal having an abrupt change of potential repeated at a frequency equal to the pulse recurrence frequency of said pulse trains and variable in timing to be capable of being made coincident with the pulses of any one of said pulse trains, driving means for causing relative movement between said first and second members, said driving means being controlled by an applied error signal and signal comparing means supplied with said derived position-indicating signal and with said control signal and providing an error signal to said driving means to effect relative movement between said first and second members until the centre of each pulse group in said derived position-indicating signal is coincident with the abrupt change of potential in said control signal.

8. Servo control means for moving a first member relatively to a second member, comprising a plurality of continuously operating signal sources providing a plurality of pulse train signals, said pulse train signals having a common pulse recurrence frequency and having their respective pulses intercalated in timing so that each pulse train, by the timing of its pulses with respect to a particular one of said plurality of pulse trains, is characteristic of a particular one of a number of discrete positional relationships between said first and second members, a plurality of separate signal providing elements positioned in fixed relationship to said second member at spaced apart positions along the path of relative movement between said first and second members, means for supplying a different one of said pulse trains to each of said signal providing elements, an electric signal pickup device secured to said first member for deriving a position-indicating signal from said signal providing elements which is representative of the instantaneous positional relationship between said first and second members, a control signal source providing a continuous control signal having an abrupt change of potential repeated at a frequency equal to the pulse recurrence frequency of said pulse trains and variable in timing to be capable of being made coincident with the pulses of any one of said pulse trains, driving means for causing relative movement between said first and second members, said driving means being controlled by an applied error signal and signal comparing means supplied with said selected signal from said electric signal pick-up device and with said control signal, said signal comparing means operating to divide each pulse form signal of said position-indicating signal into two parts at instants determined by said abrupt change of said control signal and then comparing said two parts for equality to provide an error signal to said driving means to effect relative movement between said first and second members until said selected position-indicating signal is one whose pulses are accurately divided by the abrupt changes of potential in said control signal.

9. Servo control means for controlling the position of a single transducer device movable transversely across a plurality of parallel recording tracks in a data storage device for an electronic digital computing machine, comprising a plurality of continuously operating signal sources providing a plurality of electric pulse train signals, said signals having a common pulse recurrence frequency and having their respective pulses intercalated in timing whereby the pulses of any one train are preceded and succeeded in time by pulses of other trains, the timing of the pulses in any one train, relative to the remaining trains, being different, a plurality of separate signal providing elements mounted in fixed spaced apart positions along the path of movement of said transducer device relative to said tracks whereby each signal providing element is representative of the alignment of said transducer with a different one of said recording tracks, means supplying a different one of said pulse train signals to each of said signal providing elements, an electric signal pick-up device secured to said transducer for selecting a signal from said signal providing elements which is characteristic of the instantaneous positional relationship between said transducer and said recording tracks, a control signal source providing a control signal having a characteristic signal element repeated at the recurrence frequency of the pulses in said pulse trains, the timing of said characteristic element being variable over a range of values related respectively to the timings of the pulses in said different pulse trains, driving means for causing relative movement between said transducer and said recording tracks, said driving means being controlled by an applied error signal and signal comparing means supplied with said selected signal from said signal providing means and with said control signal and providing an error signal to said driving means to effect relative movement of said transducer with respect to said recording tracks until said selected signal is one in which the pulses therein are in time coincidence with the characteristic elements of said control signal.

10. Servo means according to claim 1 wherein said control signal source includes means by which any chosen one of its plurality of different values can be initiated by a transient electric control signal.

11. Servo control means for moving a first member relatively to a second member, comprising a plurality of continuously operating signal sources providing a plurality of distinctive signals each characteristic of a different one of a number of discrete positional relationships between said first and second members, signal selector means for deriving a position indicating signal from said plurality of signals, said signal selector means comprising a plurality of separate signal providing elements each in the form of separate first capacitive electrodes, said electrodes being mounted in fixed relationship to said second member at spaced apart positions along the path of relative movement between said first and second members and an electric signal pick-up device in the form of a single conductive second capacitive electrode movable relatively to and in close spaced but non-conducting relationship to said first capacitive electrodes under the control of said first member, said first capacitive electrodes being supplied respectively with different ones of said plurality of distinctive signals whereby said pick-up device provides an output signal which is representative of the instantaneous positional relationship between said first and second members, a control signal source providing a continuously available control signal having a characteristic which is variable over a range of values related respectively in predetermined manner to each one of a plurality of signals, driving means for causing relative movement between said first and second members, said driving means being controlled by an applied error signal and signal comparing means supplied with said derived position indicating signal and said control signal and providing an error signal to said driving means to effect relative movement between said first and second members until said derived position indicating signal has the predetermined relationship to said control signal.

12. Servo control means for moving a first member relatively to a second member, comprising a plurality of continuously operating signal sources providing a plurality of distinctive signals each characteristic of a different one of a number of discrete positional relationships between said first and second members, signal selector means for deriving a position indicating signal from said plurality of signals, said signal selector means comprising a plurality of separate signal providing elements each in the form of separate first capacitive electrodes, said electrodes being mounted in fixed relationship to said second member at spaced apart positions along the path of relative movement between said first and second members and an electric signal pick-up device in the form of a single conductive second capacitive electrode movable relatively to and in close spaced but non-conducting relationship to said first capacitive electrodes under the control of said first member and a further single stationary electrode disposed along the path of movement of said second capacitive electrode to provide a capacitive output signal connection from said second capacitive electrode, said first capacitive electrodes being supplied respectively with different ones of said plurality of distinctive signals whereby said pick-up device provides an output signal which is representative of the instantaneous positional relationship between said first and second members, a control signal source providing a continuously available control signal having a characteristic which is variable over a range of values related respectively in predetermined manner to each one of a plurality of signals, driving means for causing relative movement between said first and second members, said driving means being controlled by an applied error signal and signal comparing means supplied with said derived position indicating signal and said control signal and providing an error signal to said driving means to effect relative movement between said first and second members until said derived position indicating signal has the predetermined relationship to said control signal.

13. Electrically operated position control means for moving a first member relatively to a second member comprising a plurality of continuously operating signal sources providing a plurality of pulse train signals, said pulse train signals having a common pulse recurrence frequency and having their respective pulses intercalated in timing so that each pulse train, by the timing of its pulses with respect to a particular one of said plurality of pulse trains, is characteristic of a particular one of a number of discrete positional relationships between said first and second members, a plurality of separate signal providing elements positioned in spaced fixed relationship to one another and to said first member, means for supplying a different one of said pulse trains to each of said signal providing elements, an electric signal pick-up device connected to said second member and movable with respect to said spaced signal providing elements for deriving a signal from said signal providing elements which is representative of the instantaneous positional relationship between said first and second members, a control signal source providing a control signal having a characteristic signal transient therein which is repeated at a frequency equal to the pulse recurrence frequency of said pulse trains and whose timing is capable of being varied so as to be coincident with the mid-point of the pulses of any one of said pulse trains, driving means for causing relative movement between said first and second members, said driving means being controlled by an applied error signal and signal comparing means supplied with said derived signal from said electric signal pick-up device and with said control signal and providing an error signal to said driving means to effect relative movement between said first and second members until said derived signal is one whose repetitive pulse signal components have their mid-points each coincident with said characteristic signal transient of said control signal.

14. Electrically operated position control means for moving a first member relatively to a second member comprising a plurality of continuously operating signal sources providing a plurality of pulse signal trains, said pulse signal trains having a common pulse recurrence frequency and having their respective pulses intercalated in timing so that each pulse train, by the timing of its pulses with respect to those of a particular one of said plurality of pulse trains, is characteristic of a particular one of a number of discrete positional relationships between said first and second members, signal selector means for deriving a positon indicating pulse signal train by selection of at least one pulse signal train of said plurality of pulse signal trains, said selected position indicating pulse signal train having a repetitive pulse signal component whose form and timing is representative of the instantaneous positional relationship between said first and second members, a control signal source providing a continuous control signal having a characteristic signal transient therein which is repeated at a frequency equal to the pulse recurrence frequency of said pulse trains and whose timing is variable over a range of values embracing those of the pulses in all of said pulse trains, driving means for causing relative movement between said first and second members, said driving means being controlled by an applied error signal and signal comparing means supplied with said derived position indicating pulse signal train and with said control signal and providing an error signal to said driving means to effect relative movement between said first and second members until said derived signal is one whose repetitive pulse signal components have their mid-points each coincident with said characteristic signal transient of said control signal.

15. Electrically operated position control means according to claim 14 wherein said control signal source includes means by which any chosen one of its plurality of different values can be initiated by a transient electric control signal.

References Cited in the file of this patent

UNITED STATES PATENTS

| | | |
|---|---|---|
| 2,471,075 | Montrose-Oster | May 24, 1949 |
| 2,537,427 | Seid et al. | Jan. 9, 1951 |
| 2,620,389 | Potter | Dec. 2, 1952 |
| 2,630,481 | Johnson | Mar. 3, 1953 |
| 2,630,552 | Johnson | Mar. 3, 1953 |